United States Patent [19]

Hodson et al.

[11] Patent Number: 5,189,452
[45] Date of Patent: Feb. 23, 1993

[54] REAL IMAGE PROJECTION SYSTEM

[75] Inventors: James M. Hodson, Munich, Fed. Rep. of Germany; Dennis M. Joseph, New Smyrna Beach, Fla.

[73] Assignee: General Electric Company, Philadelphia, Pa.

[21] Appl. No.: 803,540

[22] Filed: Dec. 9, 1991

[51] Int. Cl.$^5$ ............................................. G02B 27/14
[52] U.S. Cl. ...................................... 353/94; 353/99; 353/122; 359/630; 359/629
[58] Field of Search ................. 353/10, 38, 79, 94, 353/98, 81, 122; 359/443, 451, 452, 459, 629, 630, 631, 632, 636

[56] References Cited

U.S. PATENT DOCUMENTS

| | | | |
|---|---|---|---|
| 3,430,375 | 3/1969 | Altman | 359/452 |
| 3,620,592 | 11/1971 | Freeman | 353/99 |
| 3,784,742 | 1/1974 | Burnham et al. | 359/451 |
| 4,241,980 | 12/1980 | Mihalakis | 350/129 |
| 4,261,647 | 4/1981 | Ellis | 359/630 |
| 4,354,738 | 10/1982 | Forehand et al. | 359/452 |
| 4,383,740 | 5/1983 | Bordovsky | 359/631 |
| 4,731,527 | 3/1988 | Nomura et al. | 359/629 |
| 4,859,030 | 8/1989 | Rotier | 359/631 |

Primary Examiner—William A. Cuchlinski, Jr.
Assistant Examiner—William C. Dowling
Attorney, Agent, or Firm—Goeffrey H. Krauss

[57] ABSTRACT

An image projection system uses a projection screen formed over at least a portion of a spherical surface, with either a retroreflective or a directional-specific reflecting material, along with a beamsplitter and at least one lens-projector combination for each real image input to the screen. More than one different input image may be simultaneously used, either with each of the different images provided to a different area of the screen for providing juxtaposed real images to a single observer, or with each of the different real images being provided to a different observer. A non-spherical screen may be used if a retroreflective screen material is used in a system for providing simultaneous real images to spatially-separated plural observers.

16 Claims, 2 Drawing Sheets

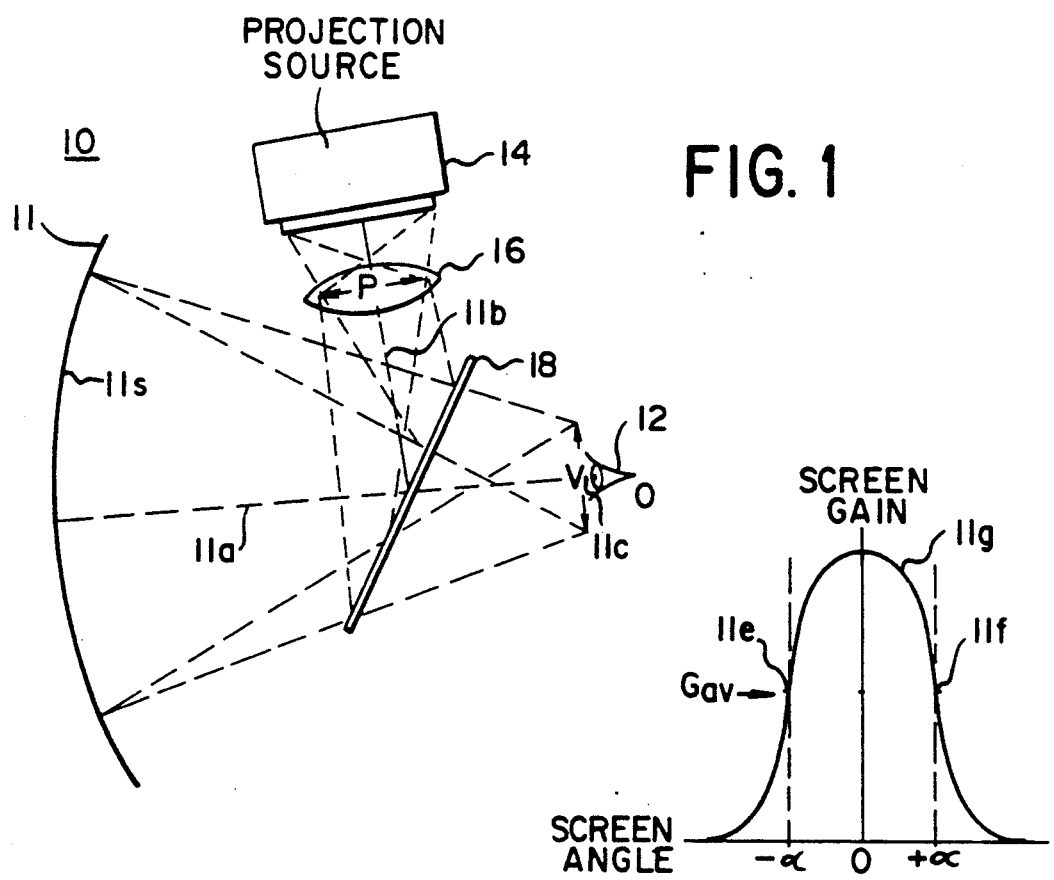
FIG. 1
FIG. 1a
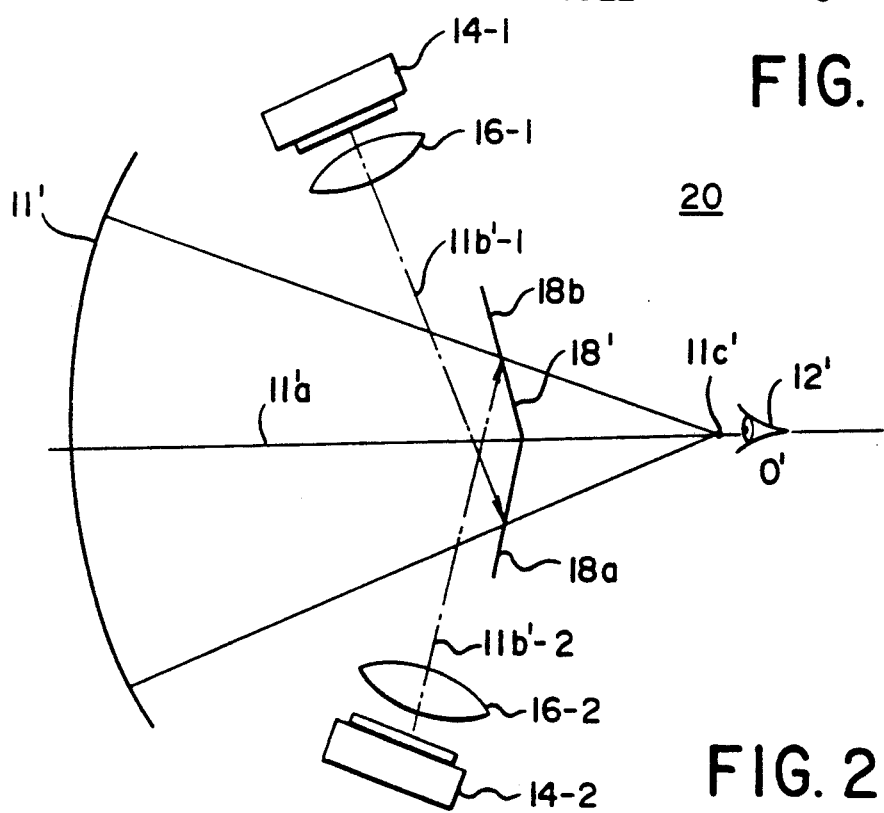
FIG. 2

REAL IMAGE PROJECTION SYSTEM

The present invention relates to image projection systems and, more particularly, to a novel video system for providing to at least one viewer a real image upon a projection screen.

BACKGROUND OF THE INVENTION

There are now several arts in which a large screen display of information to at least one viewer is desirable; even more desirable is the ability to simultaneously display multiple sets of different information upon a single viewing screen, either with all sets being viewable by a single individual or with each set being viewable by a different individual. In uses such as flight and vehicle combat simulators, a distortionless display, whether for one or several viewers, is desired so as to provide the realism necessary for best learning results. If several persons are simultaneously involved, the individuals are usually relative close together, in seating having fixed locations to the vehicle windows through which the visual information will be seen. It is then desirable to provide a display system in which each different viewer can observe a singular image on a projection screen surface where multiple images are being projected simultaneously; this system will present appropriate imagery to a specific observation volume without visually interfering with other imagery specifically intended to be observed from another viewing volume. This allows, for example, a pilot and copilot seated in a flight simulator to simultaneously observe geometrically corrected images on a common projection screen without parallax errors inherently introduced by pilot/copilot offset distances. System cost and complexity can often be minimized by allowing multiple image-for-single observer use or single image-for-each of multiple observers use to occur on a common projection screen.

BRIEF SUMMARY OF THE INVENTION

In accordance with the invention, an image projection system uses a projection screen formed over at least a portion of a spherical surface, with either a retroreflective or a directional-specific reflecting material, along with a beamsplitter and at least one lens-projector combination for each real image input to the screen. A plurality of input images may be used, either with each of plural different images provided to a different area of the screen for providing juxtaposed real images to a single observer, or with each of the plural different real images being provided to a different observer. A non-spherical screen may be used if a retroreflective screen material is used in a system for providing simultaneous real images to spatially-separated plural observers.

In presently preferred embodiments, the reflector material has a non-zero optical gain only over a small viewing cone centered about the reflected ray from the screen surface. The screen is formed of retro-reflective material, to alleviate stringent smoothness requirements, and each projector is aligned with a viewing-aperture-setting lens and a beamsplitter, with the viewing position being established at a location along a line substantially complementary to the source projection line through the associated beamsplitter.

The benefits and objects of our invention will now become apparent to those skilled in this art, upon reading the following detailed description of the present preferred embodiments of the invention, when considered in conjunction with the associated drawing FIGURES.

BRIEF DESCRIPTION OF THE DRAWINGS

FIG. 1 is a side view of a first presently preferred projection system in accordance with the principles of the present invention;

FIG. 1a is a graph illustrating the non-zero optical gain of the screen material only over a limited cone angle;

FIG. 2 is a top view of a presently preferred projection system embodiment for providing plural juxtaposed real images to a single observer from a common projection screen.

DETAILED DESCRIPTION OF THE INVENTION

Figure 3:
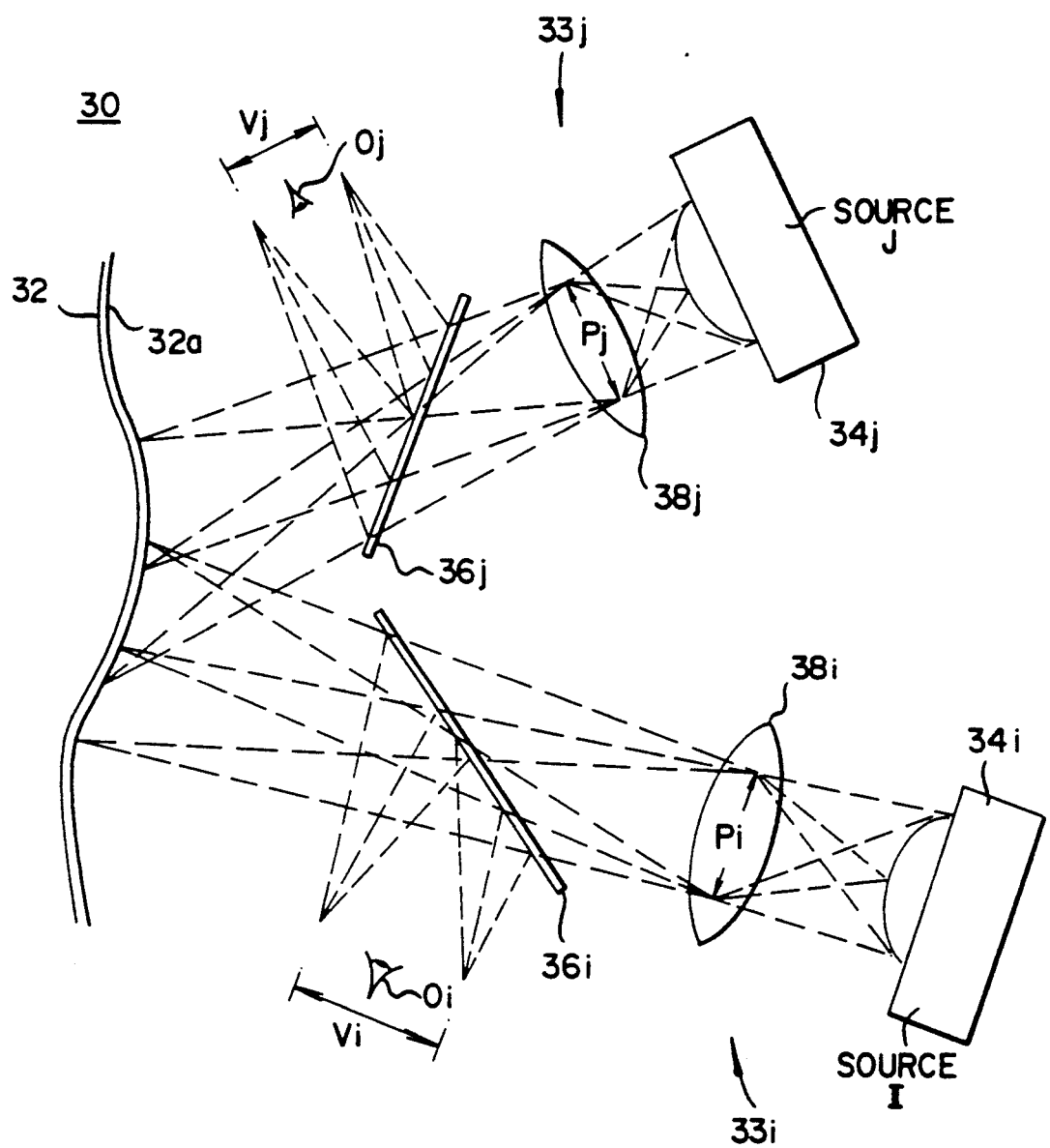
FIG. 3 is a top view of a presently preferred projection system embodiment for providing simultaneous different real images to each of a plurality of observers from a common projection screen portion.

Referring initially to FIG. 1, a projection system 10 includes a relatively large screen 11 formed upon at least a portion of the interior surface of a substantially spherical cavity. An observer 12 is placed near to, although not necessarily at, the spherical surface center-of-curvature point 11c. A projection means 14, such as a video display monitor and the like, is located beyond an associated lens means 16, with respect to a beamsplitter means 18. A point, although not necessarily the mid-point, of the beamsplitter 18 is located substantially on the optical axis 11a between the observer O and the screen. The center of lens 16 is positioned along the reflected optical axis portion 11b, responsive to the beamsplitting action of means 18, and at a distance therefrom so that the image of the lens exit pupil is superimposed along the screen optical axis 11a at the observer O position, by action of beamsplitter 18. The lens exit pupil diameter P thus provides a real image over a viewing volume determined by a diameter V.

Referring to FIG. 1a, the screen 11 may be formed of any material having a high screen surface gain, given by curve 11g, over a range of screen cone, or bend, angles up to and including the angle $\alpha$ at which the screen gain falls to an average value $G_{av}$, as at points 11e and 11f. Thus, the effectiveness of the redirection of energy is a function of the projection screen surface characteristics. Under ideal conditions, a screen surface material would be chosen such that all of the reflected light energy is directed within a selected beamwidth determined by the required viewing volume or cone angle $\alpha$. The distinguishing characteristic of the screen material must be that it reflects and diffuses incident light energy in a directionally controlled manner resembling the gain function 11g, so as to allow projected imagery to be viewed only within a specifically designed viewing volume. If the screen interior surface 11s is formed of a material similar to the Protolite material described by Mihalakis et al. in U.S. Pat. No. 4,241,980, or the like, a spherical screen 11 must be used; if the screen surface 11s is formed of a retro-reflective material (such as might comprise microscopic glass spheres embedded in a reflective substrate, such as material 1761 available from Minnesota Mining & Manufacturing (3M) and the like) then both spherical and non-spherical surface 11s shapes may be used. As an example, a high-gain screen surface can be provided with an average gain $G_{av}$ of 50 over bend angles up to $\alpha = 7.1$. Thus, the average bend angle is about 3.55, and a 6" aperture lens 16 can be imaged to an observer eyepoint 11c about 24" away from the screen surface 11s.

In this situation, with the lens and eyepoint both located at the screen center-of-curvature, the optical magnification is about 2.07. The brightness B of the center of the image, at the eyepoint, can be found from $$B = (S \cdot T_1 \cdot BS_r \cdot BS_t \cdot G_{av})/(2 \cdot F\# \cdot (M+1))^2$$

where S is the source brightness (say, 55 ft-Lamberts from a 7.5" diagonal CRT), $T_1$ is the lens transmission ratio (say, 0.88 for the 6" diameter lens with an F# of 1.3, and therefore a focal length of 7.8"), $BS_r$ is the beamsplitter reflection coefficient (say, 0.50), $BS_t$ is the beamsplitter transmission coefficient (say, 0.45), and M is the magnification. For the above situation, with $G_{av} = 50$ and $M = 2.07$, the eyepoint brightness is 8.55 ft-Lamberts.

If the viewing area V is defined by the volume edge where the brightness falls to 50% of the maximum brightness (at the view center), then this volume will also be equal to the volume where the average gain, returned to the viewer, falls to 50% of the viewer-returned center gain value. For the above illustrational system, the viewing volume radius can be found to be 4.5" in the vertical direction, so that $V = 9.0''$. Various ratios of horizontal and vertical dimensions of the viewing volume can be obtained by varying the high-gain screen surface characteristics. For example, if the above screen has a gain which falls substantially to zero at bend angles of 17.7, then the perceived display field-of-view would be about $22.5 \times 30$ with the 3:4 aspect ratio of the 7.5" diagonal CRT monitor as the image source.

Referring now to FIG. 2, in a somewhat similar system 20 each of N multiple real images from different ones of a like number N of separate sources 14i, where $1 \leq i \leq N$, can be juxtaposed together on a common screen 11' for viewing by the observer 12' situated near screen center of curvature point 11c'. Thus, a first source 14-1 operates with a first lens means 16-1 and a first portion 18a of a common beamsplitter means 18 to project a first real image towards the observer O'; a second source 14-2 operates with a second lens means 16-2 and a second portion 18b of the common beamsplitter means 18 to project a second real image towards the observer O'. With proper placement of the beamsplitter portions 18a/18b, the reflected axes 11b'-1/11b'-2 pass through the lens 16-1/16-2 from the sources 14-1/14-2 and the reflected real images will be juxtaposed adjacent to one another when viewed by observer O' near COC point 11c'.

It will now be apparent to those skilled in the art that this form of projection display system not only provides magnification of the image source picture size, with adequate brightness and viewing volume, but also allows a reduction in display envelope dimensions in the viewing direction, while providing a distortionless display due to the optical superposition of the lens pupil and viewer eyepoint. The juxtaposition of multiple real images, without gaps between adjacent images, is another benefit, although multiple source subsystems (source, lens and beamsplitter portions) are required. It will be understood that portions 18a and 18b can comprise a single beamsplitter, of appropriate shape and area, or can be separate beamsplitter elements.

Referring now to FIG. 3, in a system 30 a plurality M of different observers (say, an i-th observer $O_i$ and a j-th observer $O_j$, where $1 \leq i \leq j \leq M$) can each be provided with at least one individually viewable real display image, which is viewable only within a certain associated viewing volume (volume $V_i$ for observer $O_i$ or volume $V_j$ for observer $O_j$) and is therefore not viewable by any of the other spatially-separated viewer, if a suitable minimum viewer spacing is maintained. The screen 32 can have a viewing surface 32a of any shape, if a retro-reflective material is used. Each source means 33 (e.g. first source means 33i or second source means 33j) uses its own display means 34 and beamsplitter means 36, with its lens means 38 interposed therebetween (e.g. first source 33i has a first display means 34i, first lens means 38i and first beamsplitter 36i, while second source 33j has a second display means 34j, second lens means 38j and second beamsplitter 36j). The lens pupil $P_i/P_j$ size determines the viewing volume size $V_i/V_j$. The application of this method can be duplicated as many times as desired within the same spherical projection screen, provided spatial limitations of the projectors and observers are accounted for. Limitations of this projection approach are geometrically defined by the required offset distances between observers, and the corresponding desired screen bandwidth. Once an instantaneous observation point $O_k$ of any one k-th observer overlaps into the zone of reflectance of another observer, the two images will begin to interfere with each other. By using several optical projection means 34 and accompanying beamsplitters 36, each with its own projection lens means 38, with the same retro-reflective surface, each image will only be returned back towards its origination source. This allows for each subsystem 33 to project and receive its own imagery regardless of what is being concurrently projected onto the same area of the retro-reflective screen.

Unfortunately, the helpful characteristic of retro-reflective screen material that returns light in the direction from which it came, also serves as a limitation because of the narrow viewing volume V in which it can be observed. To overcome this beamwidth limitation of the retro-reflective screen, the projection lens 38 can be designed with a large pupil P and placed appropriately in the optical path to enlarge the viewing volume as a function of something other than the beamwidth of the screen. This allows the advantages of the retro-reflective screen material to be obtained while simultaneously overcoming its limitations.

For the most effective approach, each projector subsystem 33i must be such that all imagery emanating from that i-th projector be from a single exit pupil Pi in the optical source. It will be understood that if a multiple-pupil source were to be used, such as a CRT-type projector with 3 exit pupils, the beamwidth characteristics of the screen material must be widened appropriately to account for the extreme exit pupil positions. A single-gun light-valve projector is a good example of a full color projector source with a single exit pupil in the projection optics ideally suited for this application. In theory, any projection display system which abides by the geometry and screen characteristics prescribed herein and consists of a single exit pupil projection subsystem as the lone source of imagery for each of the plurality of observers, is usable in this invention.

If a spherical projection screen structure is used, then the screen must be as close to spherical in shape as possible given practical manufacturing limitations. Any deviation resulting in a screen tangent slope error must be accounted for in the determination of screen material beamwidth. In a theoretical case where the spherical projection screen is of perfect shape and the observation volume is reduced to a point, the screen material bandwidth can be reduced so that the reflective characteristics is like that of a mirror. The screen material must be reflective and diffuse to the degree necessary as determined by the system geometry and required viewing volume. Several materials have been previously developed to directionally control incident light reflectance. These range from specialized paints to minutely embedded concave/convex shapes in a highly reflective material. For optimum performance and maximizing usable viewing areas, the beamwidth of the screen material must be determined by the sum of the required viewing volume in addition to the slope error of the projection screen itself. The screen material best suited for this application is one which has a screen gain exhibiting a relatively flat peak and a decisive cutoff, typically referred to as a "top hat" function.

If a projection screen material with direction reflectance properties is used, then simultaneous viewing of different information by different observers of a single screen must utilize a specific system geometry: a spherical-shaped projection screen is used with single-exit-pupil projection means as an imagery source for each observer. The beamsplitter may be eliminated, if observer and projector can be placed at conjugate points relative to the spherical projection screen center of curvature, so that the chief ray emitted from the projector is redirected back towards only the associated viewer, and the other viewers receive little or no light from the non-associated projectors.

While several presently preferred embodiments of our novel multiple observer/common projection screen system have been described in detail herein, many variations and modifications will now occur to those skilled in the art. It is our intent, therefore, to be limited only by the scope of the appending claims, and not by way of the details and instrumentalities described with respect to these embodiments.

What we claim is:

1. An image projection system for providing a display of visual information to an observer, comprising:
    a projection screen formed of a selected material;
    a plurality of source means, each projecting different display information;
    a like plurality of spatially-separated beamsplitter means, each situated along an optical axis of the screen and between the screen and an observer position, for redirecting at least a portion of the illumination for an associated one of the source means substantially onto the optical axis and for passing at least a portion of the redirected illumination reflected from said screen to said observer position; and
    a plurality of lens mean, each interposed between an associated pair of said source means and said beamsplitter means, to project a like plurality of juxtaposed images into a common viewing volume occupiable by said observer.

2. The system of claim 1, wherein the lens means sets an effective exit-pupil size for the source equal to the desired viewing volume size for the observer.

3. The system of claim 1, wherein the screen material is a retro-reflective material.

4. The system of claim 3, wherein the screen has a substantially spherical surface portion facing the observer.

5. The system of claim 1, wherein the screen material is a directionally-reflecting material.

6. The system of claim 5, wherein the screen has a substantially spherical surface portion facing the observer.

7. An image projection system for providing a different display of visual information to each of a plurality of observers, comprising:
    a projection screen formed of a selected material;
    a plurality of source means, each projecting different display information;
    a like plurality of spatially-separated beamsplitter means, each situated along an optical axis of the screen and between the screen and a position of a different one of said observers, for redirecting at least a portion of the illumination for an associated one of the source means substantially onto the optical axis and for passing at least a portion of the redirected illumination reflected from said screen to the position of the associated observer; and
    a plurality of lens mean, each interposed between an associated pair of said source means and said beamsplitter means, to project from a common portion of the screen each of a like plurality of different images into each different viewing volume occupiable by a different and spatially-separated one of a plurality of observers, without significant interference with the visible information directed to any of the remaining observers.

8. The system of claim 1, wherein the common projection screen is formed of a directionally-reflecting material over at least a portion of a substantially spherical surface.

9. The system of claim 1, wherein the screen material is reflective with a non-zero screen gain only over a preselected range of screen angles.

10. The system of claim 7, wherein each lens means sets an effective exit-pupil size for the associated source, equal to the desired viewing volume size for the associated observer.

11. The system of claim 7, wherein the screen material is a retro-reflective material.

12. The system of claim 10, wherein the screen has a substantially spherical surface portion facing the observer.

13. The system of claim 1, wherein the screen material is a directionally-reflecting material.

14. The system of claim 13, wherein the screen has a substantially spherical surface portion facing the observer.

15. The system of claim 7, wherein the common projection screen is formed of a directionally-reflecting material over at least a portion of a substantially spherical surface.

16. The system of claim 1, wherein the screen material is reflective with a non-zero screen gain only over a preselected range of screen angles.

* * * * *